United States Patent
Ortmann et al.

(10) Patent No.: US 8,500,589 B2
(45) Date of Patent: Aug. 6, 2013

(54) HYBRID ELECTRIC VEHICLE POWERTRAIN WITH AN ENHANCED ALL-ELECTRIC DRIVE MODE

(75) Inventors: Walter Joseph Ortmann, Saline, MI (US); Shailesh Shrikant Kozarekar, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 539 days.

(21) Appl. No.: 12/187,664

(22) Filed: Aug. 7, 2008

(65) Prior Publication Data

US 2010/0035715 A1    Feb. 11, 2010

(51) Int. Cl.
- *F16H 37/08*    (2006.01)
- *B60W 10/02*    (2006.01)
- *B60K 6/387*    (2007.10)
- *B60K 6/445*    (2007.10)

(52) U.S. Cl.
USPC ............. 475/152; 475/5; 477/5; 477/174

(58) Field of Classification Search
USPC ................................... 475/5, 152
See application file for complete search history.

(56) References Cited

U.S. PATENT DOCUMENTS

| | | | |
|---|---|---|---|
| 5,513,719 A | 5/1996 | Moroto et al. | |
| 6,135,914 A | 10/2000 | Yamaguchi et al. | |
| 6,328,122 B1 | 12/2001 | Yamada et al. | |
| 6,405,818 B1 * | 6/2002 | Anthony et al. | 180/65.8 |
| 6,692,405 B2 | 2/2004 | Minowa et al. | |
| 6,740,002 B1 * | 5/2004 | Stridsberg | 475/5 |
| 6,793,034 B2 | 9/2004 | Raftari et al. | |
| 7,174,978 B2 * | 2/2007 | Taniguchi et al. | 180/65.1 |
| 7,175,555 B2 * | 2/2007 | Kozarekar et al. | 475/5 |
| 7,980,980 B2 * | 7/2011 | Rask et al. | 475/5 |
| 2005/0252703 A1 * | 11/2005 | Schmidt et al. | 180/65.2 |
| 2006/0142104 A1 * | 6/2006 | Saller | 475/5 |
| 2007/0080538 A1 | 4/2007 | Syed et al. | |
| 2007/0093341 A1 | 4/2007 | Supina et al. | |
| 2008/0000701 A1 * | 1/2008 | Ebner et al. | 180/65.2 |
| 2008/0125265 A1 * | 5/2008 | Conlon et al. | 475/5 |
| 2009/0188732 A1 * | 7/2009 | Janson | 180/65.1 |

FOREIGN PATENT DOCUMENTS

| | | |
|---|---|---|
| EP | 0510582 | 10/1992 |
| EP | 0953467 | 3/1999 |
| JP | 9150638 | 6/1997 |
| JP | 2008049819 | 3/2008 |
| JP | 2008114811 | 5/2008 |

OTHER PUBLICATIONS

Search Report for GB0913412.3 dated Oct. 27, 2009.
GB 0913412.3 Examination Report under Section 18(3), dated Mar. 9, 2012.

* cited by examiner

*Primary Examiner* — Justin Holmes
*Assistant Examiner* — Jacob S Scott
(74) *Attorney, Agent, or Firm* — David B. Kelley; Brooks Kushman P.C.

(57) ABSTRACT

A hybrid electric vehicle powertrain is disclosed. A gearing assembly mechanically couples an engine, an electric motor and an electric generator. During all-electric drive using the motor as a power source with the engine off, a clutch in the gearing assembly isolates elements of the gearing assembly from a power delivery path to vehicle traction wheels. A clutch may be used also to provide smooth engine starting torque when the generator acts as an engine starter motor.

11 Claims, 6 Drawing Sheets

HYBRID ELECTRIC VEHICLE POWERTRAIN WITH AN ENHANCED ALL-ELECTRIC DRIVE MODE

FIELD OF THE INVENTION

The invention relates to a hybrid electric vehicle powertrain having transmission gearing with gearing elements for establishing separate power flow paths from two power sources to vehicle traction wheels.

BACKGROUND ART

A known hybrid electric vehicle powertrain with dual power flow paths between an engine and vehicle traction wheels and between an electric motor and vehicle traction wheels will permit the vehicle to operate with maximum performance by managing power distribution from each power source. This includes managing the operating state of the engine, the electric motor, a generator and a battery.

The battery, the generator and the motor are electrically coupled. A vehicle system controller is interfaced with a transmission control module to ensure that power management for optimum performance and drivability is maintained.

The powertrain may comprise gearing that defines a parallel power flow configuration in which motor torque and engine torque are coordinated to meet a wheel torque command. The vehicle system controller may cause the engine to be shut down under certain operating conditions, such as during a steady-state highway cruising mode for the vehicle, so that the vehicle may be powered solely by the electric motor. At this time, the battery acts as a power source for the motor. If the battery state-of-charge becomes reduced below a calibrated threshold value during the all-electric drive mode, the engine may be started to charge the battery and to provide a mechanical power source to complement the electric motor torque.

An example of a hybrid electric vehicle powertrain of this type may include a planetary gear set that is used to direct engine power to either an electric power flow path or a mechanical power flow path. Such a powertrain is disclosed, for example, in U.S. Pat. No. 7,268,442, which is assigned to the assignee of this invention. That powertrain includes a planetary gear set wherein the sun gear of the planetary gear set is drivably connected to the generator, the engine is drivably connected to the carrier of the planetary gear set and the motor is drivably connected to the ring gear of the planetary gear set. The power flow path is split by the planetary gear set when both the engine and the motor are active.

If the hybrid electric vehicle powertrain is a so-called "plug-in" powertrain, the motor will be operated for a significant period of a total driving event while the engine is off. A battery charge depletion strategy then is used to supply electrical energy to the motor until a battery state-of-charge depletion threshold is reached. The battery, following charge depletion, then may be charged by a public utility electric power grid in preparation for a subsequent driving event.

When the engine speed equals zero during all-electric drive, the generator will move at a speed that is a multiple of the motor speed, depending upon the overall gear ratio of the planetary gear set. This may create a problem related to durability of bearings for the gearing and the generator. This feature limits the road speed to a value that is less than optimum. This also may reduce available torque needed to start the engine when the battery state-of-charge falls below a predetermined threshold during a given driving event before an opportunity exists for recharging the battery using the utility power grid. A need thus exists for a powertrain architecture that would be designed to avoid over-speeding of the generator during operation in an all-electric drive mode.

SUMMARY OF THE INVENTION

In one embodiment of the invention, engine power is divided into two power flow paths using gearing, including a planetary gear set that comprises a sun gear connected to a generator, a carrier connected to the engine, a planetary ring gear connected to vehicle traction wheels through torque transfer gearing and a vehicle differential-and-axle assembly. The planetary gear set directs engine power to either an electric power flow path or a mechanical power flow path.

If the powertrain is a plug-in hybrid powertrain, the sun gear of the planetary gear set, which is connected to the generator, will be driven at a speed that may be two or three times faster than the speed of the motor when the engine is off as the vehicle operates in an all-electric drive mode. The battery capacity is significantly increased so that electrical energy from a utility electric grid can be used to charge the battery to drive the vehicle.

The direct connection of the generator to the wheels in a plug-in hybrid powertrain causes the generator to turn at a speed that is a function of gear ratio when the engine is off. As vehicle speed increases, the generator speed, as previously mentioned, may become excessively high and create a potential problem related to durability of the bearings for the planetary gear set and the generator. This is avoided by the present invention.

The powertrain of the disclosed embodiment of the invention includes a disconnect clutch to disconnect the generator from the powertrain. During all-electric drive, the clutch will be disconnected, and during conventional hybrid driving, it will be engaged.

In accordance with a first embodiment of the invention, the clutch is located on the torque output side of the planetary ring gear during all-electric drive. According to a second embodiment of the invention, the clutch is located between the generator and the sun gear of the planetary gear set.

In the first embodiment, the engine and the generator are isolated by the clutch from the motor and the gearing, including the planetary gear set, thereby reducing spin losses during all-electric drive. In the second embodiment, the generator is isolated by the clutch from the gearing. Further, the clutch in the first embodiment, which may be a fluid pressure operated clutch, can be provided with a clutch slipping characteristic in torque delivery from the engine thereby mitigating dynamic engine starting torque transients distributed to the powertrain. In the case of the second embodiment, proper control of the clutch pressure will maintain a desired slip as the engine speed is brought up to its target speed during an engine start event. Both of these features may be accomplished using a closed-loop controller technique with a feedback algorithm for which actual engine speed is a feedback variable.

BRIEF DESCRIPTION OF THE DRAWINGS

FIG. 3 is a lever analogy diagram for the planetary gear set when the engine is on;

PARTICULAR DESCRIPTION OF EMBODIMENTS OF THE INVENTION

Figure 1:
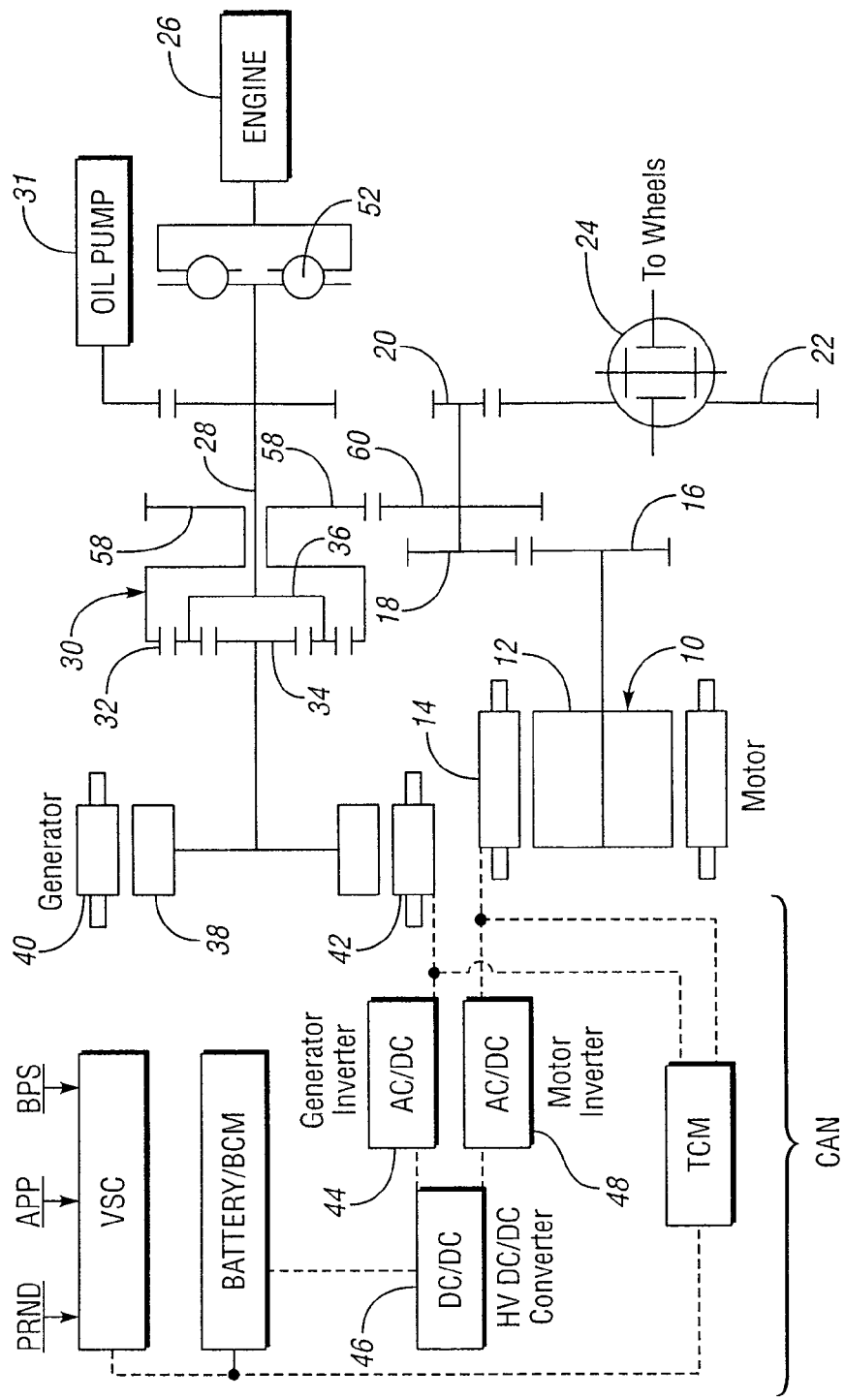
FIG. 1 is a schematic diagram of a hybrid electric vehicle powertrain with divided power flow paths.

A schematic representation of the architecture for a known hybrid electric vehicle powertrain is shown in FIG. 1. It includes an electric motor 10 with a rotor 12 and a stator 14. Rotor 12 is drivably connected to gear 16, which meshes with countershaft gear 18. A companion countershaft gear 20 engages drivably gear 22 of a differential-and-axle assembly 24, which in turn drives the vehicle traction wheels. Engine 26, which may be an internal combustion engine or any other suitable vehicle engine (e.g., spark-ignition or diesel) is connected to power input shaft 28 for a planetary gear set 30. A transmission oil pump 31 can be geared to the shaft 28.

The planetary gear set includes ring gear 32, sun gear 34 and a planetary carrier 36. Sun gear 34 is connected drivably to the rotor 38 of generator 40. The stator 42 for the generator 40 is electrically coupled to a high voltage inverter 44 and a DC/DC high voltage converter 46, the latter in turn being electrically coupled to the battery, as shown. (A battery control module is designated BCM in FIG. 1). A high voltage inverter 48 is coupled to the stator 14 of motor 10.

The engine 26 is connected drivably to shaft 28 through a damper assembly 52. The differential-and-axle assembly 24 is drivably connected to vehicle traction wheels.

The power flow elements are under the control of a transmission control module (TCM), which is under a supervisory control of a vehicle system controller (VSC). The TCM and the VSC are part of a control area network (CAN). Input variables for the VSC may include a driver operating range selector (PRNDL) signal, an accelerator pedal position (APP) signal and a brake pedal signal (BPS). When the generator is commanded to assist the engine during a forward drive vehicle launch, it may be controlled to function as a motor, whereby the carrier turns in a vehicle driving direction. When the generator 40 is acting as a generator to charge the battery, it acts as a reaction element as electric power is used to complement engine power. When the generator is used to crank the engine when the vehicle is moving, the generator is controlled to function as a generator, which causes the torque delivered to the sun gear to slow down the sun gear. This results in an increase in carrier speed and engine speed as ring gear speed increases. The electric motor also provides torque to drive the ring gear at this time. Some of the electric power then is used to crank the engine. If the ring gear speed is high enough, the carrier speed reaches an engine ignition speed before the generator speed slows down to zero. If the vehicle speed is low, it is possible that the engine speed will not reach the ignition speed even when the generator speed has decreased to zero. In this case, the generator is controlled to function as a motor.

When the transmission architecture of FIG. 1 is used in a so-called "plug-in" hybrid vehicle, the motor 10 is used for a considerable percentage of the total operating time for any given driving event with the engine off. At this time, a direct mechanical connection exists between the motor and the generator. The generator speed thus becomes high when the vehicle speed is at moderate or high levels.

Figure 4:
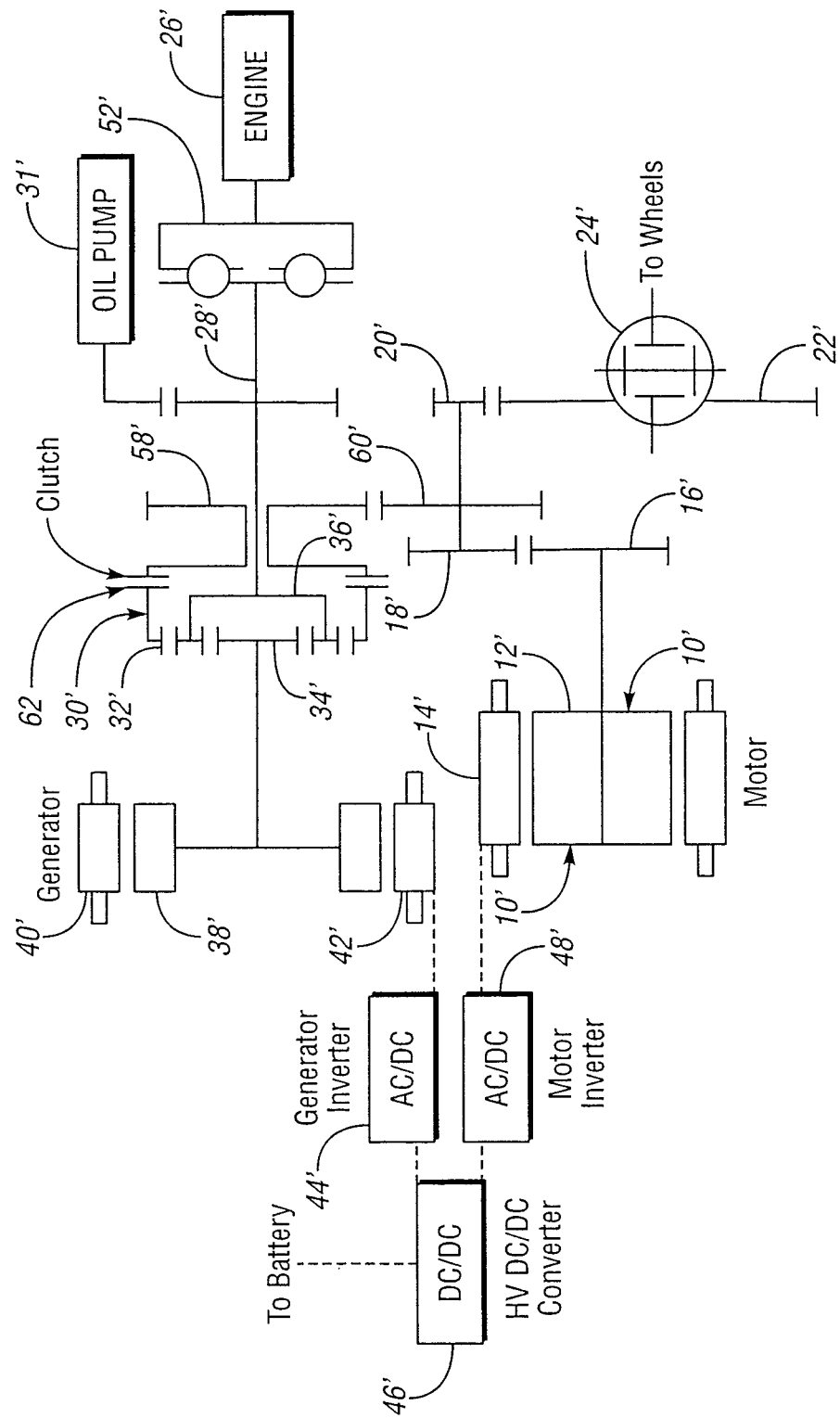
FIG. 4 is a schematic diagram of a hybrid electric vehicle powertrain according to a first embodiment of the invention wherein the clutch is located at the ring gear of the planetary gear set.

Unlike the known hybrid electric vehicle powertrain illustrated schematically in FIG. 1, a hybrid electric vehicle powertrain incorporating a first embodiment of the invention is shown in FIG. 4. Elements of the powertrain of FIG. 4 that are common to the elements of the powertrain of FIG. 1 have been identified by similar reference numerals, although prime notations are added to the common elements in FIG. 4. Unlike the design of FIG. 1, the ring gear 32' of the powertrain of FIG. 4 is connected selectively by a clutch to gear 58', which is drivably connected to countershaft gear 60', which in turn is drivably connected to the differential-and-axle assembly 24'. The clutch is schematically illustrated in FIG. 4 at 62.

Clutch 62 decouples the planetary gear set 30' from the motor so that the motor does not drive the generator during motor drive with the engine off.

Figure 2:
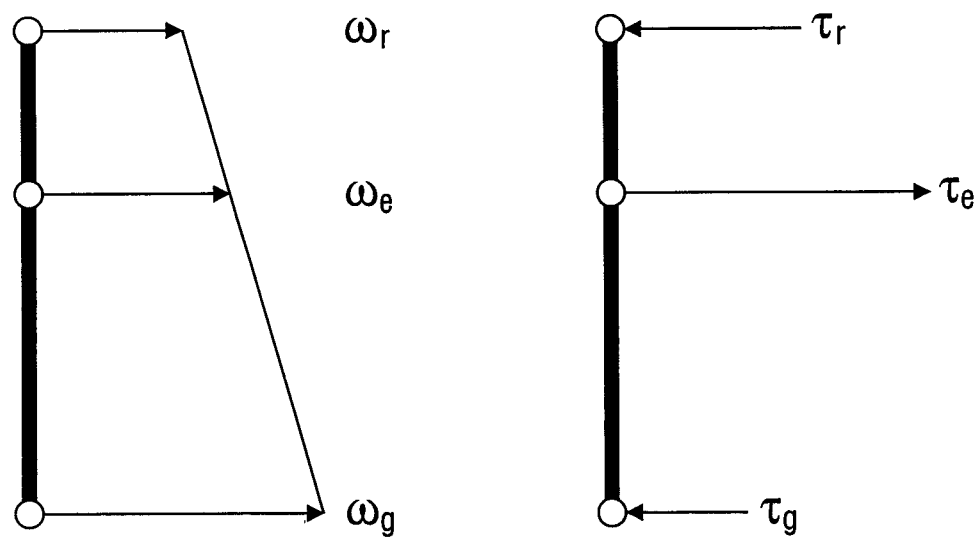
FIG. 2 is a lever analogy that will be used to describe the function of the planetary gear set.
Figure 3:
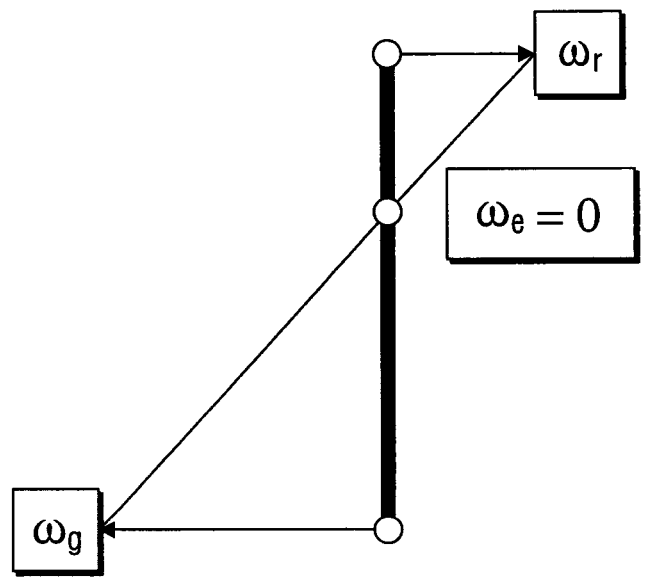

The engine on and off conditions are illustrated by the lever analogy shown in FIGS. 2 and 3, respectively. FIG. 2 shows speed and torque vectors that exist during motor drive with the engine on for the powertrain illustrated in FIG. 1. In FIG. 2, $\omega_r$ is the ring gear speed, the ring gear being connected to the traction motor through gears 60, 18 and 20. The symbol $\omega_e$ is the planet gear carrier speed, the planet gear carrier being connected to the engine. The symbol $\omega_g$ is the sun gear speed, the sun gear being connected to the generator. The symbol $\tau_r$ in FIG. 2 represents ring gear torque, the symbol $\tau_e$ represents engine torque, and the symbol $\tau_g$ represents generator torque during operation with the engine on.

If the engine is off and the powertrain is powered solely by the motor, as in the case of a plug-in hybrid powertrain, a public electric utility grid is used to charge the battery and the battery is designed to have a significantly increased capacity. This makes possible much greater use of the electric drive mode.

The direct geared connection of the generator to the wheels, which is indicated in FIG. 1, causes the generator to turn as the vehicle moves with the engine off. Upon an increase in vehicle speed, the generator speed may become excessively high and the torque available to start the engine is lowered. This condition is illustrated in FIG. 3 where $\omega_g$ is the generator speed. The ring gear is driven in the opposite direction from the direction indicated in FIG. 2 when the engine is on. The engine speed, of course, is zero at this time, as indicated in FIG. 3 by the symbol $\omega_e$. The ring gear speed at this time is $\omega_r$, which is equal in value to the value for $\omega_r$ in FIG. 2.

The addition of the clutch 62, as seen in FIG. 4, disconnects the generator from the traction wheels. When the powertrain functions to start the engine after an operating period using the motor as a sole power source, the generator can be put in speed control with a set speed that would be necessary to place the engine at its target speed for engine starts, which depends on the vehicle speed and the speed ratio of the gearing. The clutch then would be controlled smoothly in a closed-loop fashion using actual wheel speed measurements, multiplied by gear ratio, as a feedback variable. Clutch pressure will be controlled by a closed-loop controller, which may be part of the vehicle system control (VSC) module seen in FIG. 1, to maintain a predetermined slip across the clutch. The slip would not only mitigate torsional transients, but also would keep the generator speeds at a proper level. The clutch reaction torque at this time would be taken by the motor. The clutch torque would be a function of the pressure in the clutch.

Figure 5:
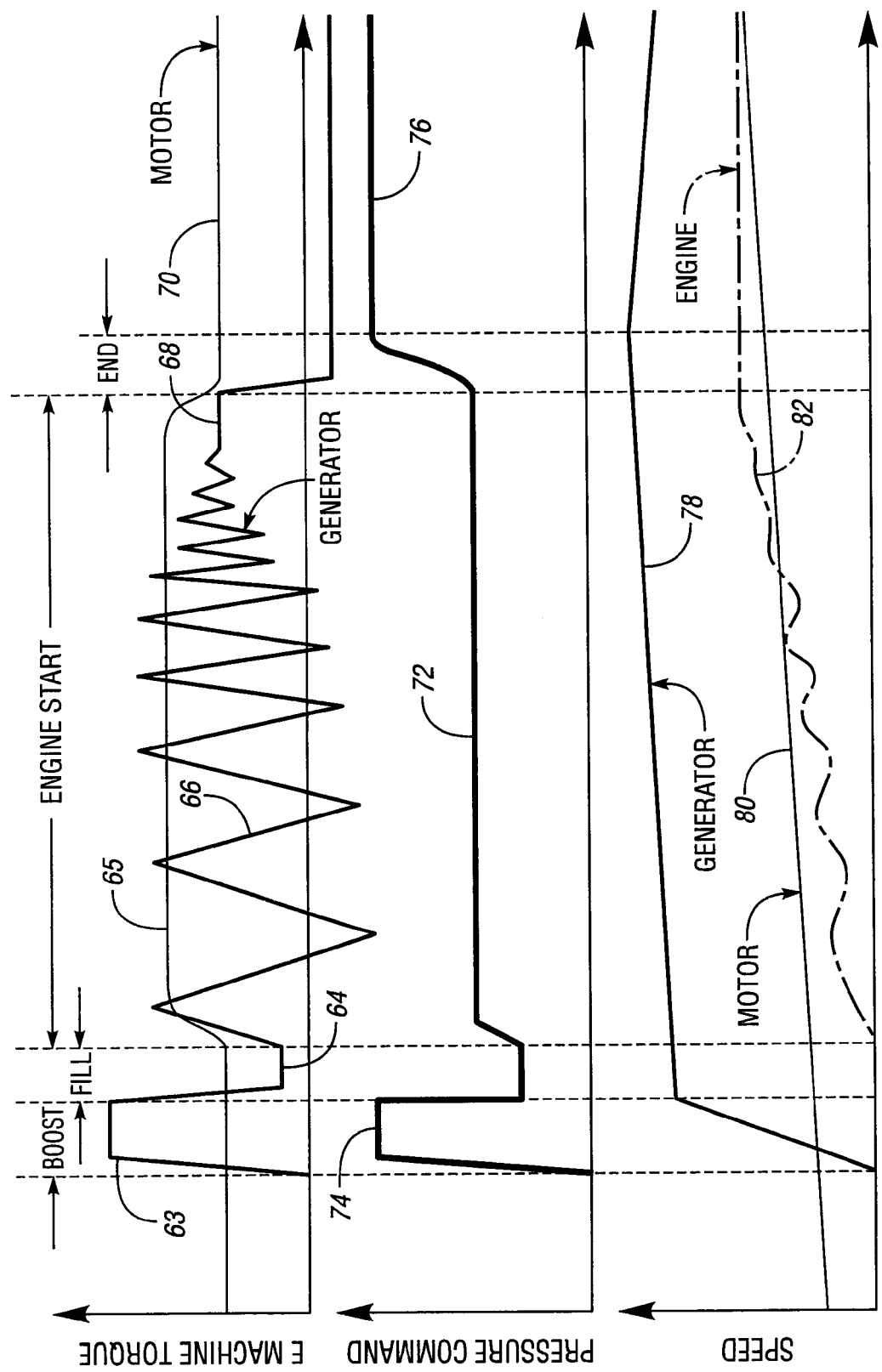
FIG. 5 is a time plot for motor and generator torque during an engine start event, a time plot of a clutch pressure command during an engine start event and a time plot for generator speed, motor speed and engine speed during an engine start event.

In the known powertrain transmission of FIG. 1, the reaction torque is also taken by the motor; but since there is a direct mechanical connection, this torque oscillates with the engine cycles. This condition is illustrated in FIG. 5 where motor torque is plotted against time during an engine start. At the initiation of an engine start, the generator torque is increased for a short interval to bring the generator torque to a predetermined level, as shown at 63. That is followed by a clutch pressure fill time at 64. As the clutch engages, motor torque increases to its steady-state value shown at 65. Once the clutch is engaged, the engine will begin to rotate. Engine torque disturbances will cause dynamic torque disturbances at the generator, as shown at 66. At the end of the engine start cycle, the torque fluctuations are reduced, as shown at 68, and motor torque then returns to its initial value, as shown at 70.

The pressure command issued to the transmission control module (TCM) by the vehicle system controller is plotted at 72. At the beginning of the plot, the pressure command is increased, as shown at 74. The pressure command then is reduced to smoothly engage the clutch, as shown at 72. Final clutch engagement then is commanded, as shown at 76, after the engine start.

Shown also in FIG. 5 is a plot of generator speed, motor speed, and engine speed during the engine start interval. Generator speed is shown at 78. Motor speed is shown at 80, and engine speed is shown at 82. Fluctuations in engine speed, shown in the plot at 82, are typical of the dynamic torque disturbances that occur during starting of an internal combustion engine.

Figure 6:
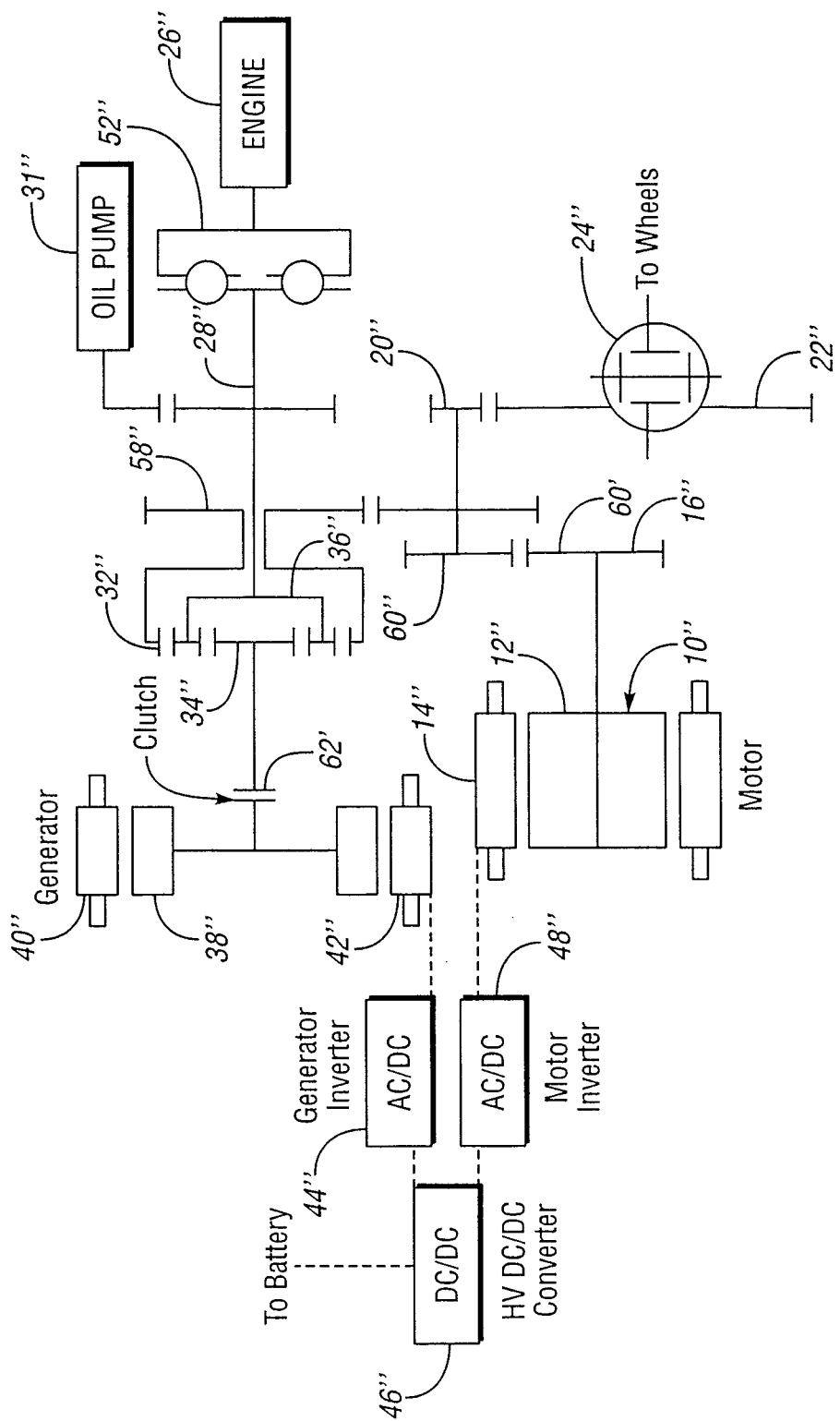
FIG. 6 is a schematic representation of the powertrain illustrated in FIG. 1 together with a clutch located between the generator and the sun gear of a planetary gear set.

A second embodiment of the invention is schematically illustrated in FIG. 6. The elements of the powertrain of FIG. 6 that are common to the embodiment of FIG. 4 are illustrated by similar numerals, although double prime notations are used in FIG. 6. The clutch is designated by the symbol 62'.

In FIG. 6, the clutch 62' is located between the generator and the sun gear 34' rather than between the motor and the ring gear 32'. In the case of the embodiment of FIG. 6, proper control of the clutch is achieved using a closed-loop controller to maintain a desired slip across the clutch, thereby setting the engine speed at its target value. The closed-loop controller uses proper control of clutch pressure using sun gear speed multiplied by gear ratio as a feedback variable. The clutch reaction torque is taken directly by the motor as in the case of the known powertrain of FIG. 1. Using the configuration of FIG. 6, the motor reaction torque will be similar to the reaction torque of the powertrain of FIG. 1, while the torque in the generator will be smoother.

Figure 7:
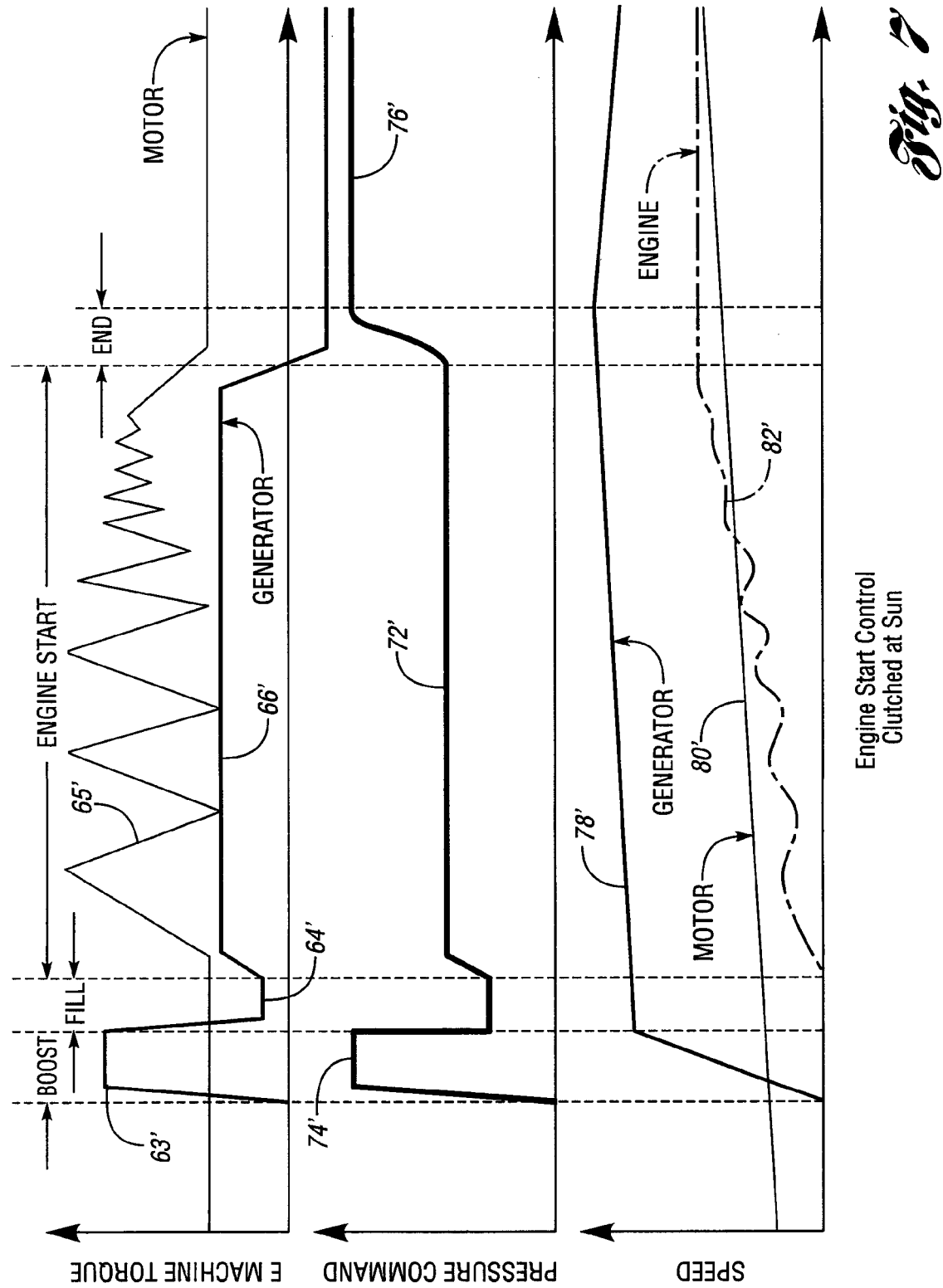
FIG. 7 is a time plot similar to the plot of FIG. 5 for a powertrain that includes a clutch as seen in FIG. 6.

FIG. 7 is a plot of the motor torque, pressure command, speed of the generator, speed of the motor and speed of the engine during an engine start event for the powertrain in FIG. 6. The plots correspond to the plots seen in FIG. 5. In the case of FIG. 6, the generator is isolated from the engine by the clutch 62'. Thus, the motor torque in the case of FIG. 6 fluctuates, as shown at 65' in FIG. 7, and the generator torque, shown at 66' in FIG. 7, is relatively unchanged during the engine start event. That is because the motor torque is not isolated from the engine by the clutch 62'.

Although the embodiments of the invention have been disclosed, it will be apparent to persons skilled in the art that modifications may be made without departing from the scope of the invention.

What is claimed is:

1. A hybrid electric vehicle powertrain, comprising:
    parallel power paths from a motor and an engine to traction wheels;
    a planetary gearset having a sun gear coupled to a generator by a clutch therebetween, a ring gear coupled to the motor, and a carrier coupled to the engine; and
    a controller that controls the clutch to disconnect the generator from the sun gear and the motor during an all-electric drive mode with the engine off.

2. The hybrid electric vehicle powertrain set forth in claim 1 wherein the clutch is a pressure actuated friction slipping clutch with pressure controlled to slip the clutch such that torque fluctuations in the powertrain are attenuated as a generator acts as an engine starter motor.

3. A hybrid electric vehicle powertrain comprising:
    a clutch connected to a ring gear of a planetary gearset and a motor;
    a controller that operates the clutch to start the engine, wherein operating the clutch includes maintaining a predetermined non-zero slip across the clutch to mitigate transients and maintain a generator speed;
    wherein a sun gear of the planetary gearset is connected to the generator; and
    a carrier of the planetary gearset is connected to the engine.

4. The hybrid electric vehicle powertrain set forth in claim 3 wherein the clutch is a pressure actuated friction slipping clutch and wherein the controller controls the clutch pressure to slip the clutch during engagement to start the engine when the generator acts as a motor.

5. A method for controlling a hybrid vehicle having a powersplit powertrain configuration with planetary gearing coupling a generator to an engine and a motor arranged to deliver power through parallel power delivery paths to vehicle traction wheels, and a clutch connected to a ring gear of the planetary gearing to selectively isolate the generator, comprising:
    operating the motor in an electric drive mode to power the vehicle traction wheels with the engine off;
    operating the clutch in the electric drive mode to isolate the planetary gearing from the motor; and
    selectively engaging the clutch to start the engine, wherein selectively engaging the clutch includes maintaining a predetermined non-zero slip across the clutch to mitigate transients and maintain generator speeds.

6. The method of claim 5 wherein operating the clutch comprises controlling clutch pressure.

7. The method of claim 5 wherein operating the clutch comprises disengaging the clutch so that motor torque is not transmitted to the generator.

8. The method of claim 5 further comprising setting the generator at a speed corresponding to a target engine speed for engine starts, engaging the clutch, and increasing a motor torque to a steady state value as the clutch is engaged.

9. A hybrid vehicle comprising:
    an internal combustion engine;
    a first electric machine functioning primarily as a generator;
    a second electric machine functioning primarily as a motor;
    a planetary gearset having a plurality of planet gears, a sun gear, a carrier, and a ring gear, the carrier being connected to the internal combustion engine, the sun gear being connected to the first electric machine via a selectively engageable pressure controlled friction clutch, and the ring gear being in constant meshing engagement with the second electric machine and vehicle traction wheels;
    a traction battery coupled to the first and second electric machines; and
    a controller operable to control clutch pressure of the friction clutch to disengage the first electric machine from the second electric machine and the internal combustion engine when the vehicle is operating in an electric only mode with the internal combustion engine off and power supplied by the traction battery to the second electric machine.

10. The hybrid vehicle of claim 9 wherein the controller is operable to control the clutch pressure to slip the clutch when starting the internal combustion engine using the first electric machine.

11. A hybrid vehicle comprising:
an internal combustion engine;
a first electric machine functioning primarily as a generator;
a second electric machine functioning primarily as a motor;
a planetary gearset having a plurality of planet gears, a sun gear, a carrier, and a ring gear, the carrier being connected to the internal combustion engine, the sun gear being connected to the first electric machine, and the ring gear being connected via a selectively engageable pressure controlled friction clutch to a gear in constant meshing engagement with the second electric machine and vehicle traction wheels;
a traction battery coupled to the first and second electric machines; and
a controller operable to control clutch pressure of the friction clutch to disengage the first electric machine from the second electric machine and the internal combustion engine when the vehicle is operating in an electric only mode with the internal combustion engine off, to set the generator at a speed corresponding to a target engine speed for engine starts, and to control the clutch to start the engine, wherein controlling the clutch includes maintaining a predetermined non-zero slip across the clutch to mitigate transients and maintain generator speeds.

* * * * *